United States Patent
Deng et al.

(10) Patent No.: US 10,345,595 B2
(45) Date of Patent: Jul. 9, 2019

(54) HEAD MOUNTED DEVICE WITH EYE TRACKING AND CONTROL METHOD THEREOF

(71) Applicant: HTC Corporation, Taoyuan (TW)

(72) Inventors: Qing-Long Deng, Taoyuan (TW); Yung-Chen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/704,002

(22) Filed: Sep. 14, 2017

(65) Prior Publication Data

US 2018/0095282 A1 Apr. 5, 2018

Related U.S. Application Data

(60) Provisional application No. 62/401,909, filed on Sep. 30, 2016.

(51) Int. Cl.
*G02B 27/01* (2006.01)
*G06F 3/01* (2006.01)
*G06F 1/16* (2006.01)

(52) U.S. Cl.
CPC ......... *G02B 27/0172* (2013.01); *G06F 1/163* (2013.01); *G06F 3/011* (2013.01); *G06F 3/013* (2013.01); *G02B 2027/0138* (2013.01); *G02B 2027/0187* (2013.01)

(58) Field of Classification Search
CPC ........ G02B 27/0172; G02B 2027/0187; G02B 2027/0138; G06F 3/011; G06F 1/163; G06F 3/013
See application file for complete search history.

(56) References Cited

U.S. PATENT DOCUMENTS

| 8,786,675 B2 | 7/2014 | Deering | |
| 2006/0250322 A1* | 11/2006 | Hall | G02B 27/0172 345/8 |
| 2016/0012643 A1* | 1/2016 | Kezele | G02B 27/0172 345/633 |
| 2017/0195663 A1* | 7/2017 | Stafford | G06F 3/013 |

OTHER PUBLICATIONS

Corresponding Taiwan office action dated Jan. 31, 2019.

* cited by examiner

*Primary Examiner* — Abhishek Sarma

(74) *Attorney, Agent, or Firm* — CKC & Partners Co., LLC

(57) ABSTRACT

A head mounted device include a displayer, an eye-tracking module and a control module. The eye-tracking module is configured for tracking positions and movements of two pupils. The control module is communicated with the displayer and the eye-tracking module. The control module is configured to determine a target object located in front of the head mounted device according to the positions of the pupils. The control module is further configured to obtain a gap distance between the pupils and the target object. The control module is further to calculate a dimensional parameter of the target object according the gap distance and the movements of the pupils. The control module is further to display the dimensional parameter on the displayer.

20 Claims, 9 Drawing Sheets

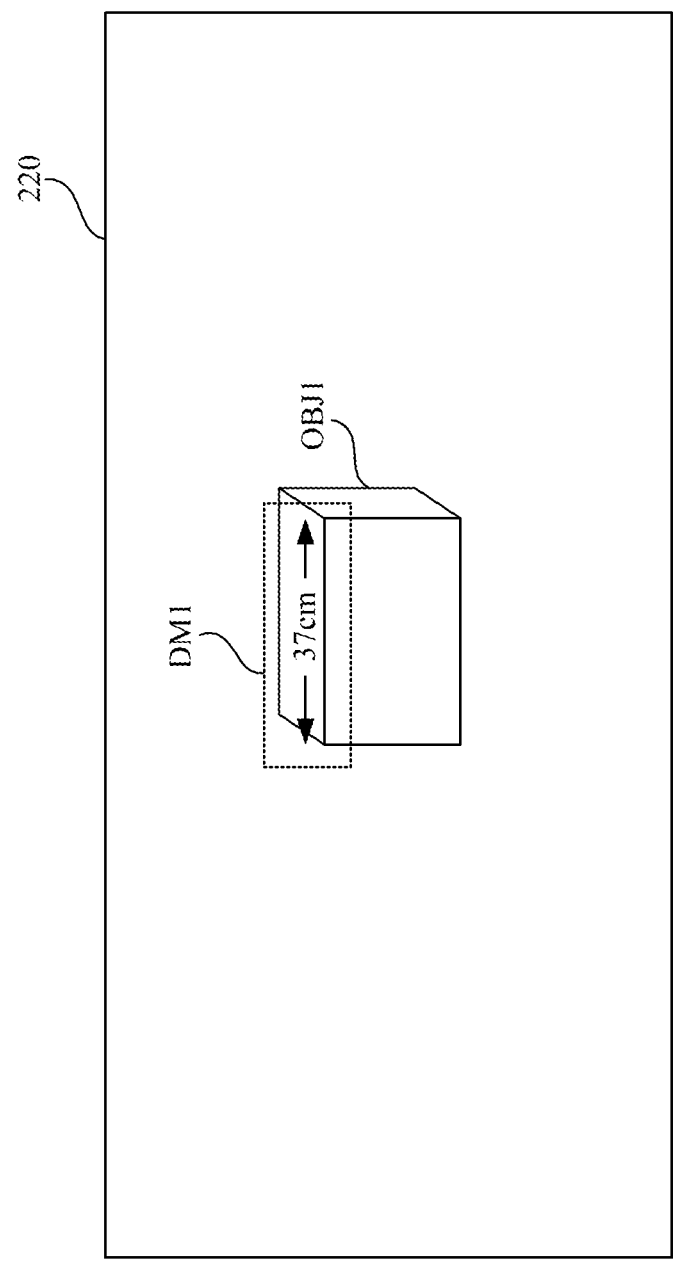

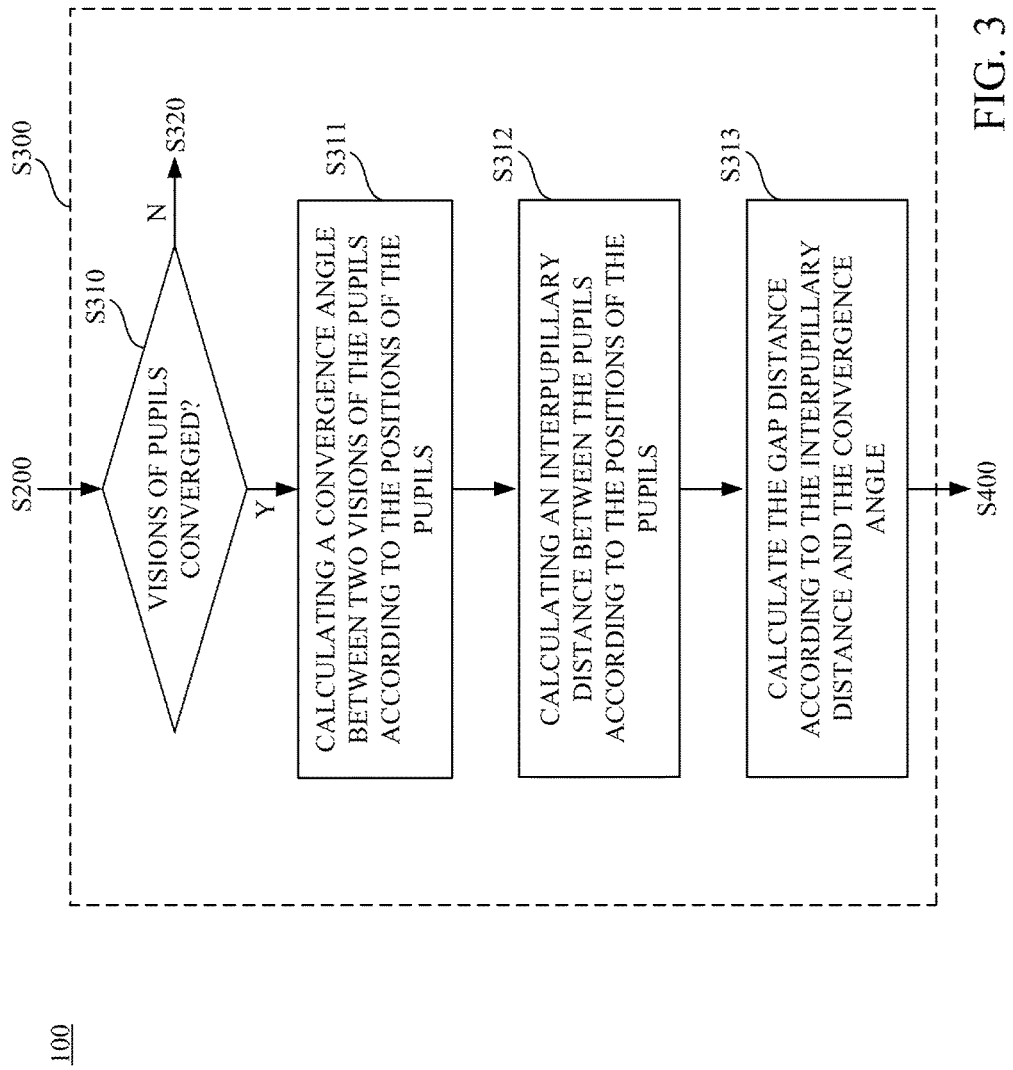

HEAD MOUNTED DEVICE WITH EYE TRACKING AND CONTROL METHOD THEREOF

RELATED APPLICATIONS

This application claims priority to U.S. Provisional Application Ser. No. 62/401,909 filed Sep. 30, 2016, which is herein incorporated by reference.

BACKGROUND

Field of Invention

The present application relates to a head mounted device. More particularly, the present application relates to a control method for a head mounted device with eye tracking function.

Description of Related Art

In virtual reality (VR), augmented reality (AR), substitutional reality (SR) or mixed reality (MR) system, the head mounted device is one of the main components. The head mounted device can be mounted on user's head, and the user can see a scenario created by the VR, AR, SR or MR system through a displayer on the head mounted device.

Since the head mounted device are mounted on user's head, it will be inconvenient for the user to manipulate buttons, keys or switches disposed on the head mounted device. Many interface components are developed to different applications of the head mounted devices. Some models of the head mounted devices include components for tracking movements of users eyes. Based on the movements of the eyes, the system can obtain some information or receive input commands from the user.

SUMMARY

An embodiment of the disclosure provides a head mounted device, which include a displayer, an eye-tracking module and a control module. The eye-tracking module is configured for tracking positions and movements of two pupils. The control module is communicated with the displayer and the eye-tracking module. The control module is configured to determine a target object located in front of the head mounted device according to the positions of the pupils. The control module is further configured to obtain a gap distance between the pupils and the target object. The control module is further to calculate a dimensional parameter of the target object according the gap distance and the movements of the pupils. The control module is further to display the dimensional parameter on the displayer.

An embodiment of the disclosure provides a control method, which is suitable for a head mounted device. The control method include following operations. Positions and movements of two pupils are tracked. A target object located in front of the head mounted device is determined according to the positions of the pupils. A gap distance between the pupils and the target object is obtained. A dimensional parameter of the target object is calculated according the gap distance and the movements of the pupils. The dimensional parameter is displayed on a displayer of the head mounted device.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 2C is a schematic diagram illustrating a demonstrational example about what is shown on the displayer according to an embodiment of the disclosure.

FIG. 3 is a flow diagram illustrating further operations within one operation shown in FIG. 1 according to an embodiment of the disclosure.

DETAILED DESCRIPTION

Figure 1:
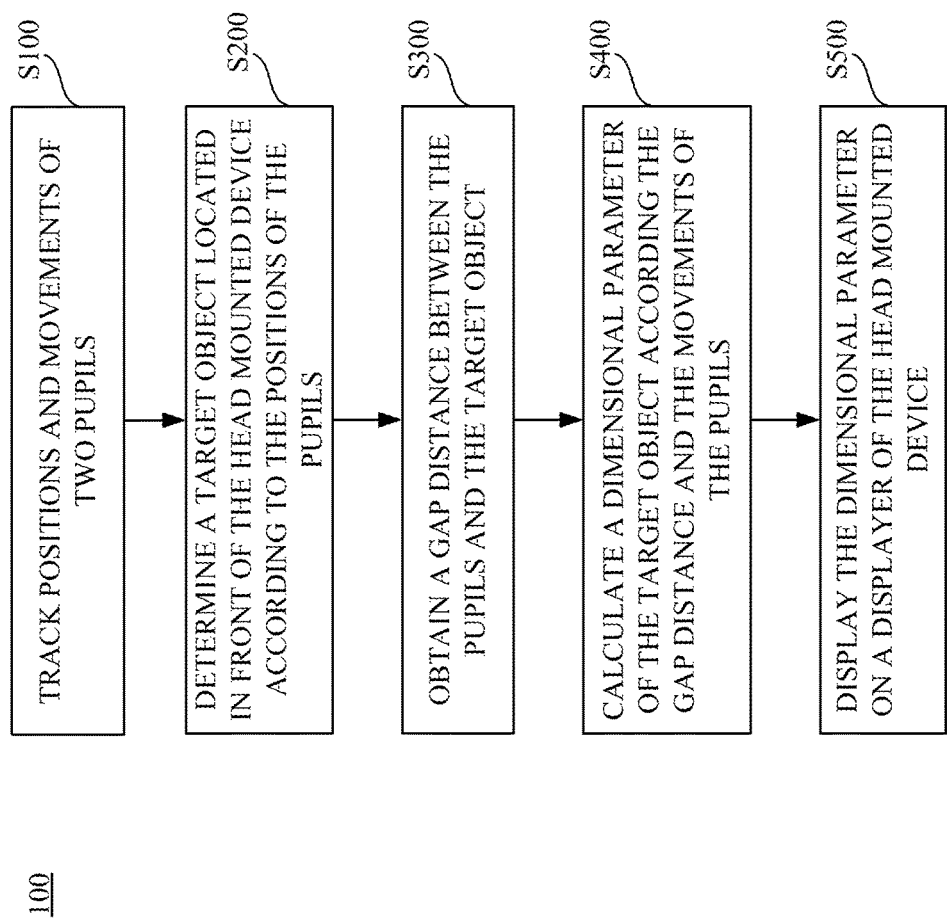
FIG. 1 is a flow diagram illustrating a control method according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
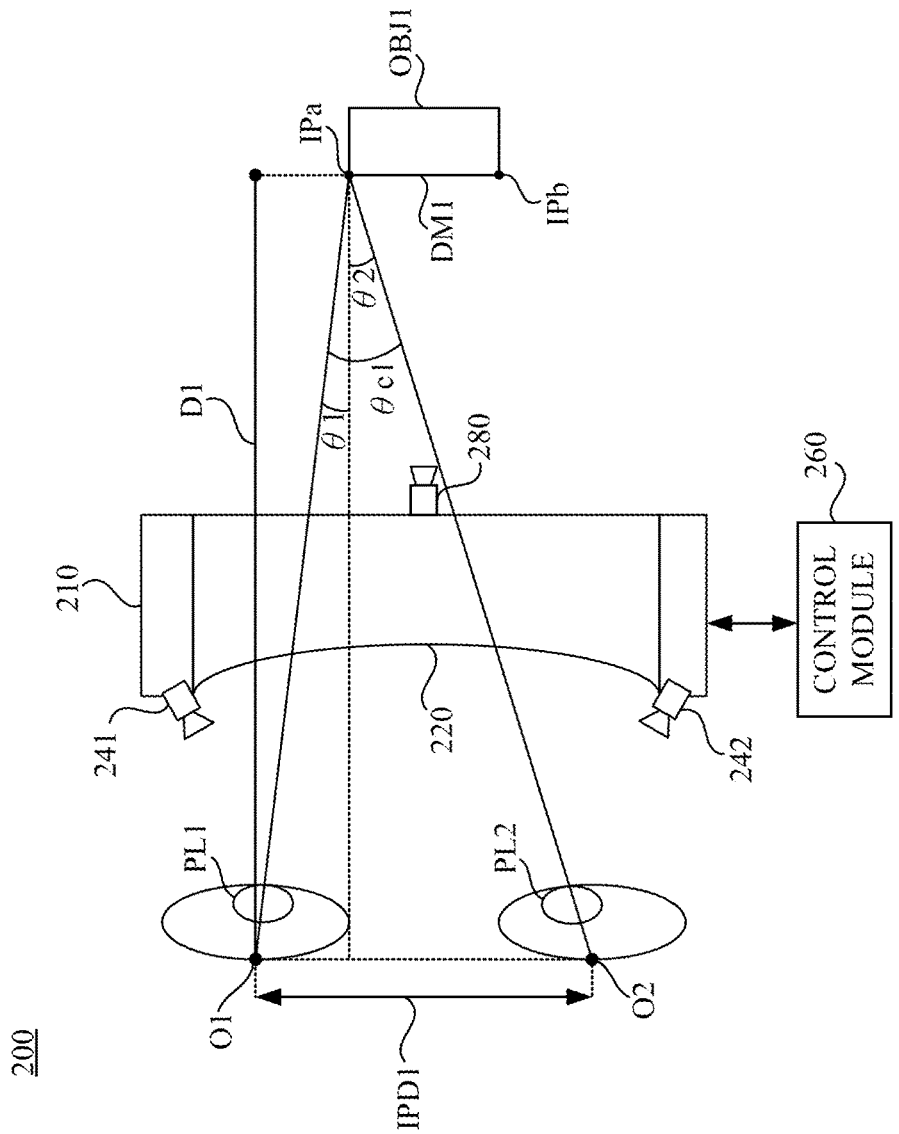
FIG. 2A is a schematic diagram illustrating a head mounted device according to an embodiment of the disclosure.

Reference is made to FIG. 1 and FIG. 2A. FIG. 1 is a flow diagram illustrating a control method 100 according to an embodiment of the disclosure. FIG. 2A is a schematic diagram illustrating a head mounted device 200 according to an embodiment of the disclosure. The control method 100 in FIG. 1 is suitable to be utilized on the head mounted device 200 shown in FIG. 2A.

As shown in FIG. 2A, the head mounted device 200 includes a headset 210, a displayer 220, an eye-tracking module (including two eye-tracking cameras 241 and 242) and a control module 260. The headset 210 can be worn on the head of a user.

The control module 260 is communicated with the displayer 220, the eye-tracking camera 241 and the eye-tracking camera 242. The control module 260 is implemented by a processor, a central processing unit, a graphic processing unit and/or a control integrated circuit. In some embodiments, the control module 260 can be disposed on the headset 210 and electrical connected to the displayer 220, the eye-tracking camera 241 and the eye-tracking camera 242. In some other embodiments, the control module 260 can be disposed independent from the headset 210, and be implemented on a computer, a server or a cloud processing server wireless communicated with the displayer 220, the eye-tracking camera 241 and the eye-tracking camera 242.

As shown in FIG. 2A, the displayer 220 is disposed on the headset 210 and located in front of eyes of the user. The displayer 220 is configured to cover visions of both eyes of the user, such that the user can see a screen displayed on the displayer 220.

In an embodiment, the displayer 220 is a see-through display. The user is able to see through the displayer 220, and the user is able to see a target object OBJ1 located in front of the head mounted device 200. In the embodiment of the see-through display, the target object OBJ1 is directly visible to the user wearing the head mounted device 200.

In another embodiment, the displayer 220 is a non-see-through display. In this case, the head mounted device 200 includes a front camera module 280. The front camera module 280 is communicated with the control module 260. The front camera module is configured to capture a front image covering the target object OBJ1 located in front of the head mounted device 200. The front image captured by the front camera module 280 is processed into stereoscopic visions and displayed on the displayer 220. In this embodiment, the user is able to see the stereoscopic visions of the target object OBJ1 on the displayer 220.

As shown in FIG. 1, operation S100 of the control method 100 is performed to track positions and movements of two pupils of the user. As the embodiment shown in FIG. 2A, the two eye-tracking cameras 241 and 242 of the eye-tracking module are disposed on opposite sides on the headset 210. The eye-tracking cameras 241 and 242 are configured for tracking positions and movements of two pupils PL1 and PL2. In some embodiments, the eye-tracking cameras 241 and 242 are able to capture sequential images of the pupils PL1 and PL2 over time.

In each of the sequential images captured by the eye-tracking cameras 241 and 242, the positions of the pupils PL1 and PL2 can be located relative to original points O1 and O2 of the pupils. In some embodiments, the original points O1 and O2 can be assigned at center points of the eye sockets of the user, or be assigned to certain spots of the pupils PL1 and PL2 when the user relax his/her eyes and looks straight forward. The movements of two pupils PL1 and PL2 can be obtained by comparing every two adjacent images among the sequential images. In this case, the eye-tracking cameras 241 and 242 are able to track the positions and the movements of the pupils PL1 and PL2.

In the embodiment, the positions and the movements of the pupils PL1 and PL2 provide some information about what the user interest in. Operation S200 of the control method 100 is performed to determine a target object OBJ1 located in front of the head mounted device 200 according to the positions of the pupils PL1 and PL2. As the embodiment shown in FIG. 2A, the eyes of the user focus on an interested point IPa on the target object OBJ1. Operation S200 is performed to determine the target object OBJ1 located in front of the head mounted device 200 according to the positions of the pupils PL1 and PL2.

In the embodiment shown in FIG. 2A, according to the sequential images captured by the eye-tracking cameras 241 and 242, the control module 260 is able to detect that the user focuses on an interested point IPa on the target object OBJ1.

Figure 2B:
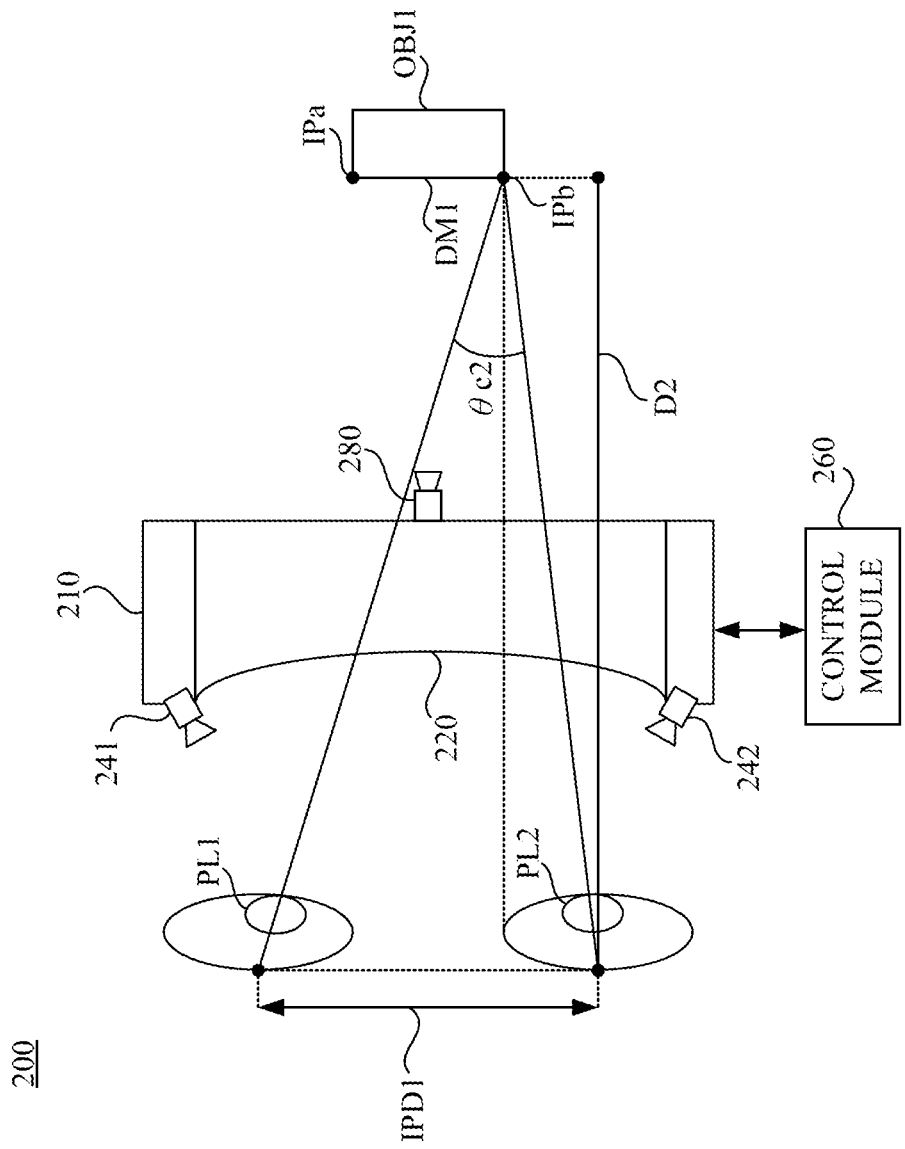
FIG. 2B is a schematic diagram illustrating the head mounted device in FIG. 2A.

Reference is further made to FIG. 2B, which is a schematic diagram illustrating the head mounted device 200 in FIG. 2A. In the embodiment shown in FIG. 2B, the user move his/her pupils to focus on another interested point IPb.

As shown in FIG. 2B, the pupils PL1 and PL2 move to different positions to focus on the interested point IPb, and the eye-tracking cameras 241 and 242 are able to detect the positions of the pupils PL1 and PL2 in FIG. 2B, and also the movements of the pupils PL1 and PL2 from FIG. 2A to FIG. 2B.

In the embodiment, the head mounted device 200 is able to provide some information of the target object OBJ1 according to the eye tracking results detected by the eye-tracking cameras 241 and 242. For example, when the user is curious about a real size of the target object OBJ1, the head mounted device 200 is able to measure a size of the target object OBJ1 and provide the information of the displayer 220, such that the user can easily acknowledge dimensions of the target object OBJ1 in the real world, without going over to the target object OBJ1 and physically applying a ruler on the target object OBJ1. If the user is detected to move the pupils PL1/PL2 from the position shown in FIG. 2A to the positions shown in FIG. 2B, the head mounted device 200 is able to measure a dimension parameter DM1 (i.e., a length on the left edge shown in FIG. 2A and FIG. 2B) of the target object OBJ1. For example, the head mounted device 200 not only measures a length, a width, a height and an angle of an object but also measures a vector what is both eyes looking at. How to measure the size of the target object OBJ1 is discussed in following paragraphs.

As shown in FIG. 1, operation S300 of the control method 100 is performed to obtain a gap distance between the pupils PL1/PL2 and the target object OBJ1. After the gap distance is known, operation S400 of the control method 100 is performed to calculate the dimensional parameter DM1 as shown in FIG. 2A and FIG. 2B according to the gap distance and the movements of pupils PL1 and PL2. Details about the operations S300 and S400 will be further explained in following paragraphs.

Afterward, operation S500 is performed to display the dimensional parameter DM1 on the displayer 220 of the head mounted device 200. Reference is further made to FIG. 2C, which is a schematic diagram illustrating a demonstrational example about what is shown on the displayer 220 according to an embodiment of the disclosure.

There are different manners to obtain the gap distance between the pupils PL1/PL2 and the target object OBJ1. Reference is made to FIG. 2A and FIG. 3 to explain a way to obtain the gap distance between the pupils PL1/PL2 and the target object OBJ1. FIG. 3 is a flow diagram illustrating operations S310-S313 within the operation S300 shown in FIG. 1 according to an embodiment of the disclosure.

As shown in FIG. 3, operation S310 is performed to detect whether the visions of pupils PL1 and PL2 are converged. Normally, when the user focus on a near object (e.g., an object located within 10 meters), the pupils PL1 and PL2 will move toward each other a little bit. In other words, a distance between the pupils PL1 and PL2 will be reduced, such that the eye-tracking cameras 241 and 242 are able to sense that the pupils PL1 and PL2 are converged (as shown in FIG. 2A). If the user focus on a far object (an object located over 10 meters away), the visions of the user will be relaxed and look straight in parallel, and the visions of the visions of pupils PL1 and PL2 are not converged in this case.

As the embodiment shown in FIG. 2A, the visions of pupils PL1 and PL2 are converged at the interested point IPa on the target object OBJ1. Operation S311 is performed to calculate a convergence angle θc1 between two visions of the pupils PL1 and PL2. In this case, the control module 260 is able to detect a first angle θ1 (through the eye-tracking camera 241) according to a position of the pupil PL1 relative to the original point O1. In this case, the control module 260 is able to detect a second angle θ2 (through the eye-tracking camera 241) according to a position of the pupil PL2 relative to the original point O2. A sum of the first angle θ1 and the second angle θ2 is calculated by the control module 260 to obtain the convergence angle θc1 between two visions of the pupils PL1 and PL2.

Operation S312 is performed by the control module 260 to calculate the interpupillary distance IPD1 between the pupils PL1 and PL2. The interpupillary distance IPD1 between the pupils PL1 and PL2 can be calculated by measuring a distance between two center points of the eye sockets, or by measuring a distance between the pupils PL1 and PL2 when the eyes are relaxed and look straight. As shown in FIG. 2A, the interpupillary distance IPD1 is the distance measured between the original point O1 and the original point O2. In some other embodiments, the interpupillary distance IPD1 can be manually assigned by the user of the head mounted device 200, such as the head mounted device 200 has an adjustable knob (not shown in figures) and the user can rotate the adjustable knob to set the interpupillary distance IPD1.

Operation S313 in FIG. 3 is performed by the control module 260 to calculate the gap distance D1 between the pupils PL1/PL2 and the interested point IPa of the target object OBJ1. The gap distance D1 is calculated according to the interpupillary distance IPD1 and the convergence angle θc1 as shown in FIG. 2A based on a trigonometric function.

As shown in FIG. 2B and FIG. 3, similarly, the operations S311-S313 can be applied on the embodiment shown in FIG. 2B. Operation S311 is performed to calculate another convergence angle θc2 between two visions of the pupils PL1 and PL2. In an embodiment, operation S312 is performed to calculate the interpupillary distance IPD1. In another embodiment, operation S312 can be skipped because the interpupillary distance IPD1 is already known. Operation S313 is preformed to calculate the gap distance D2 between the pupils PL1/PL2 and the interested point IPb of the target object OBJ1 according to the interpupillary distance IPD1 and the convergence angle θc2 as shown in FIG. 2B based on the trigonometric function. The gap distance D2 in FIG. 2B can be equal to or different from the gap distance D1 shown in FIG. 2A.

When the pupils are moved from the positions shown in FIG. 2A to the positions shown in FIG. 2B, the positions of the pupils are detected to move simultaneously. In this case, the convergence angle θc1/θc2 is calculated according to concurrent positions of the pupils PL1/PL2.

After the gap distance D1/D2 are calculated in the operation S300 shown in FIG. 3, the control method 100 returns to the operation S400 shown in FIG. 1 to calculate the dimensional parameter DM1 as shown in FIG. 2A and FIG. 2B according to the gap distance D1/D2 and the movements of pupils PL1 and PL2. Since the interpupillary distance IPD1 and the gap distance D1/D2 is already known, the dimensional parameter DM1 can be calculated by the control module 260 according to the movements of the pupils PL1 and PL2 between the positions in FIG. 2A and FIG. 2B.

The dimensional parameter DM1 is in positively correlation with the interpupillary distance IPD1. When the interpupillary distance IPD1 is larger, the dimensional parameter DM1 will be larger. When the interpupillary distance IPD1 is shorter, the dimensional parameter DM1 will be shorter.

The dimensional parameter DM1 is also in positively correlation with the gap distance D1/D2. When the gap distance D1/D2 is larger, the dimensional parameter DM1 will be larger. When the gap distance D1/D2 is shorter, the dimensional parameter DM1 will be shorter.

The dimensional parameter DM1 is also in positively correlation with the movements of the pupils PL1 and PL2 between FIG. 2A and FIG. 2B. When the movements of the pupils PL1 and PL2 is larger, the dimensional parameter DM1 will be larger. When the movements of the pupils PL1 and PL2 is shorter, the dimensional parameter DM1 will be shorter.

The operation S500 shown in FIG. 1 is performed to display the dimensional parameter DM1 on the displayer 220 as shown in FIG. 2C. In an embodiment, the front camera module 280 is configured to capture a front image covering the target object OBJ1 located in front of the head mounted device 200. As shown in FIG. 2C, the dimensional parameter DM1 (which states the length of an upper edge of the target object OBJ1 is equal to 37 cm) is displayed at a corresponding position of the target object OBJ1 on the displayer 220. In an embodiment, the corresponding position of the target object OBJ1 on the displayer 220 is determined by the front image captured by the front camera 220.

Based on aforesaid embodiments, the control method 100 and the head mounted device 200 are able to measure the dimensional parameter DM1 of the target object OBJ1 according to the interpupillary distance IPD1, the gap distance D1/D2 (derived from the convergence angle θc1/θc2) and the movements of the pupils P1 and P2. In this case, the user can easily obtain the size information about the target object OBJ1 which the user focuses on.

Figure 4:
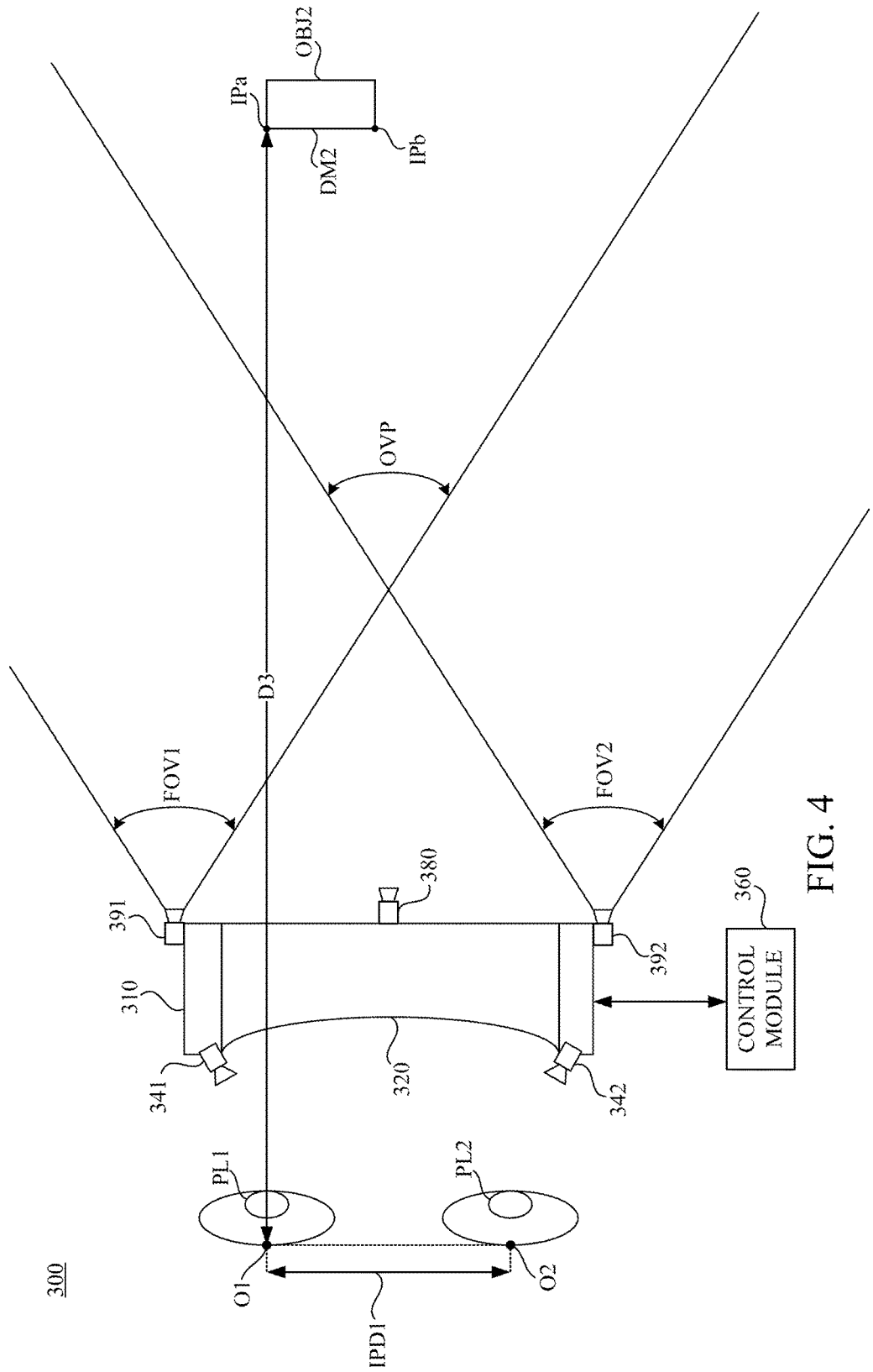
FIG. 4 is a schematic diagram of a head mounted device according to another embodiment of the disclosure.

On the other hand, if the user focuses on a far object (an object located over 10 meters away), the visions of the user will be relaxed and look straight in parallel. In this case, the head mounted device 200 cannot calculate any convergence angle between the visions of the visions of pupils PL1 and PL2 (or the convergence angle will be too smaller, and it will be hard to measure the convergence angle precisely when the target object is far away). Reference is further made to FIG. 4. FIG. 4 is a schematic diagram of a head mounted device 300 according to another embodiment of the disclosure. The head mounted device 300 shown in FIG. 4 is capable of calculating a dimensional parameter of a target object located away from the head mounted device 300.

The head mounted device 300 shown in FIG. 4 includes a headset 310, a displayer 320, an eye-tracking module (including two eye-tracking cameras 341 and 342), a control module 360 and a front camera module 380. The structural features, functions and behaviors of the headset 310, the displayer 320, the eye-tracking cameras 341 and 342, the control module 360 and the front camera module 380 are similar to the components (i.e., the headset 210, the displayer 220, the eye-tracking cameras 241 and 242, the control module 260 and the front camera module 280) of the head mounted device 200 in aforesaid embodiments shown in FIG. 2A and FIG. 2B, and not to be repeated here again.

In the embodiment shown in FIG. 4, the head mounted device 300 further includes a depth camera module. The depth camera module includes image sensors 391 and 392 for generating a depth map in front of the head mounted device 300. The image sensor 391 has a first field of view FOV1. The image sensor 392 has a second field of view FOV2. The image sensors 391 and 392 are able to detect depth distribution of any object located within an overlapping region OVP between the first field of view FOV1 and the second field of view FOV2. As shown in FIG. 4, the image sensors 391 and 392 of the depth camera module is able to detect a depth value of the target object OBJ2.

Figure 5:
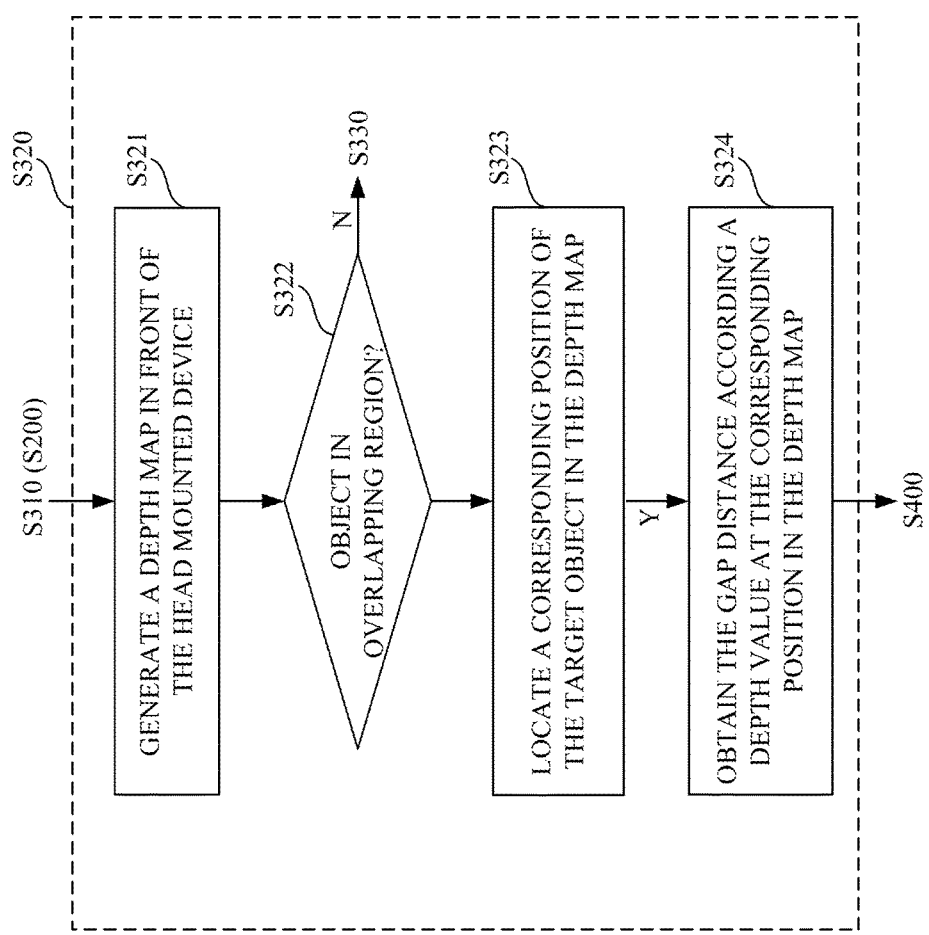
FIG. 5 is a flow diagram illustrating further operations within one operation shown in FIG. 1 according to an embodiment of the disclosure.

Reference is further made to FIG. 5, which is a flow diagram illustrating operation S320 within the operation S300 shown in FIG. 1 according to an embodiment of the disclosure. In an embodiment, the operation S320 in FIG. 5 is performed after the operation S310 in FIG. 3 when the visions of pupils PL1 and PL2 are not converged. In another embodiment, the operation S320 in FIG. 5 is performed right after the operation S200 in FIG. 1 regardless of whether the visions of pupils PL1 and PL2 are converged or not. As shown in FIG. 5, the operation S320 includes operations S321-S324. Referring to FIG. 4 and FIG. 5, operation S321 is performed to generate a depth map in front of the head mounted device 300 by the depth camera module (including the image sensors 391 and 392). Operation S322 is performed to detect whether the target object OBJ2 is located in the overlapping region OVP or not. In the embodiment shown in FIG. 4, the target object OBJ2 is located in the overlapping region OVP.

When the target object OBJ2 is located in the overlapping region OVP, operation S323 is performed by the control module 360 to locate a corresponding position of the target object OBJ2 in the depth map. In an embodiment, the corresponding position of the target object OBJ2 can be located according to a front image captured by the front camera module 380. Afterward, operation S324 is performed by the control module 360 to obtain the gap distance D3 according the depth value at the corresponding position in the depth map. In this embodiment, the gap distance D3 is decided according to the depth value from the depth map, without referring to a convergence angle. Based on the operation S320 shown in FIG. 5, the gap distance D3 between the target object OBJ2 (far from the user) and the pupils PL1/PL2 can be obtained. Afterward, the control method 100 returns to the operations S400 shown in FIG. 1. Referring to FIG. 1 and FIG. 4, operation S400 is performed to calculate the dimensional parameter DM2 of the target object OBJ2 according the gap distance D3 and the movements of the pupils PL1/PL2. The movements of the pupils PL1/PL2 are detected while the pupils PL1/PL2 moving from one interested point IPa to another interested point IPb of the target object OBJ2. Operation S500 is performed to display the dimensional parameter DM2 of the target object OBJ2 on the displayer 320.

In aforesaid embodiment shown in FIG. 4 and FIG. 5, the image sensors 391 and 392 of the depth camera module is able to detect the depth value of the target object OBJ2 located within the overlapping region OVP. However, the depth camera module is unable to provide a depth value of another target object located outside the overlapping region OVP.

Figure 6:
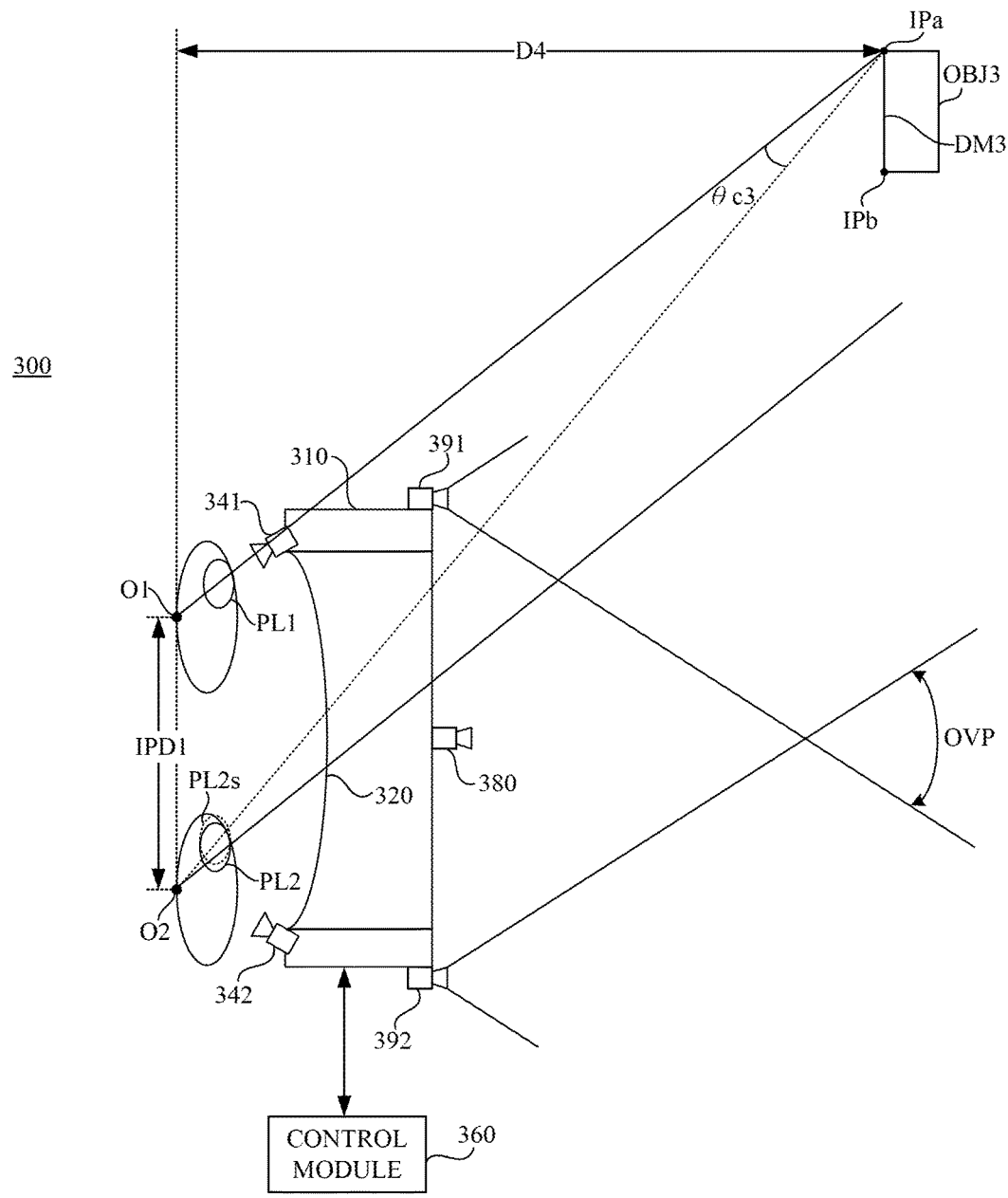
FIG. 6 is a schematic diagram of the head mounted device in FIG. 4 and a target object located outside an overlapping region according to another embodiment of the disclosure.
Figure 7:
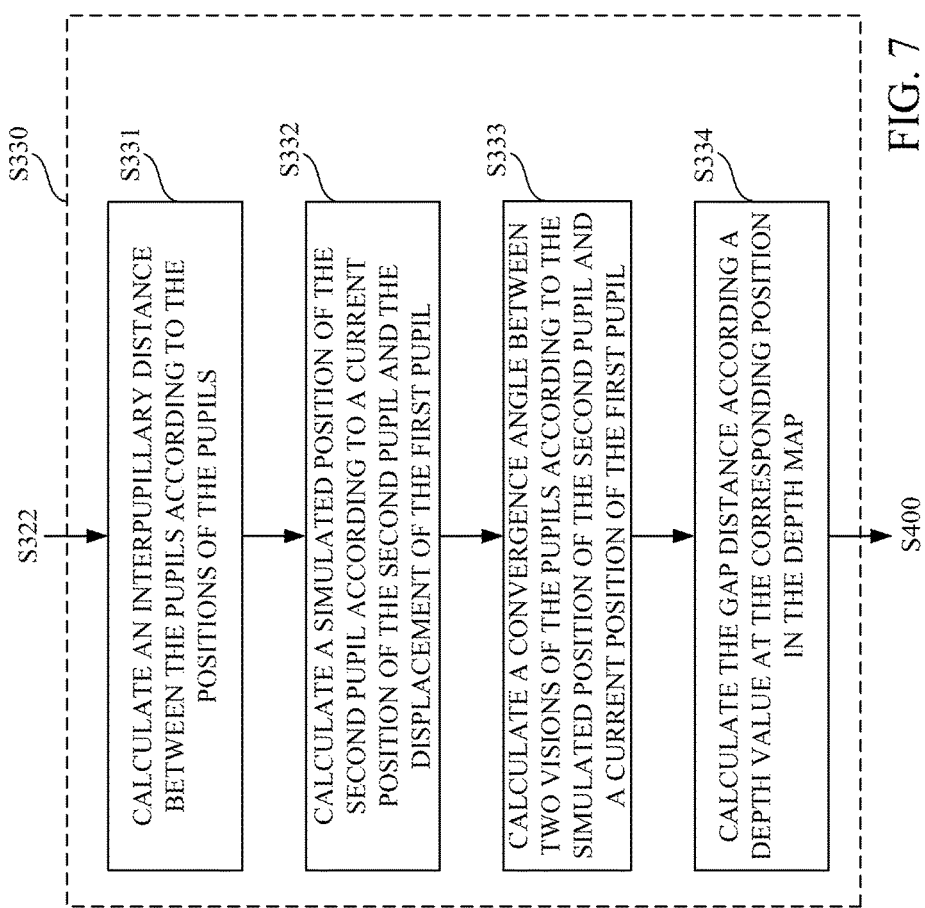
FIG. 7 is a flow diagram illustrating further operations within one operation shown in FIG. 1 according to an embodiment of the disclosure.

Reference is further made to FIG. 6. FIG. 6 is a schematic diagram of the head mounted device 300 and a target object OBJ3 located outside the overlapping region OVP according to another embodiment of the disclosure. In this case, the gap distance D4 between the target object OBJ3 and the pupils PL1/PL2 is not able to be obtained from a depth value from the depth map. Reference is further made to FIG. 7, which is a flow diagram illustrating operation S330 within the operation S300 shown in FIG. 1 according to an embodiment of the disclosure. In an embodiment, the operation S330 in FIG. 7 is performed after the operation S322 in FIG. 5 when the target object OBJ3 are not in the overlapping region OVP as shown in FIG. 6.

As shown in FIG. 6, the target object OBJ3 is located on the left side in front of the user. In this case, because the target object OBJ3 is not located in the overlapping region OVP, the control module 360 is not able to obtain a depth value of the target object OBJ3 from the depth map. The control module 360 will calculate the gap distance D4 according to a convergence angle between two visions of the pupils according to the positions of the pupils (similar to operations S311-S313 shown in FIG. 3).

In addition, in this embodiment, because the target object OBJ3 is far into the left, the right pupil PL2 has to move leftward to look at the target object OBJ3. However, a movable range of the pupil PL2 is limited. When the pupil PL2 is moved leftward to an orbital border, the pupil PL2 will stop at a certain point (e.g., the position of the pupil PL2 shown in FIG. 6) and cannot move further. In the meantime, the left pupil PL1 may have some room to move a little further after the pupil PL2 has stopped.

Referring to FIG. 6 and FIG. 7, operation S331 is performed by the control module 360 to calculate an interpupillary distance IPD1 between the pupils PL1 and PL2 according to the positions of the pupils PL1 and PL2. When one pupil PL1 is detected to move further with a displacement when the other pupil PL2 is detected to stop at an orbital border, operation S332 is performed by the control module 360 to calculate a simulated position (as the simulated position PL2s shown in FIG. 6) of the pupil PL2. The simulated position PL2s is calculated according to a current position of the pupil PL2 and the displacement of the pupil PL1 (the displacement is accumulated since the pupil PL2 is stopped at the orbital border). Operation S333 is performed by the control module 360 to calculate a convergence angle $\theta c3$ between two visions of the pupils PL1/PL2 according to the simulated position PL2s of the right pupil PL2 and a current position of the left pupil PL1. Operation S334 is performed by the control module 360 to calculate the gap distance D4 according to the interpupillary distance IPD1 and the convergence angle $\theta c3$.

Based on the operation S330 shown in FIG. 6, the gap distance D4 between the target object OBJ3 and the pupils PL1/PL2 can be obtained. Afterward, the control method 100 returns to the operations S400 shown in FIG. 1. Referring to FIG. 1 and FIG. 6, operation S400 is performed to calculate the dimensional parameter DM3 of the target object OBJ3 according the gap distance D4 and the movements of the pupils PL1/PL2. The movements of the pupils PL1/PL2 are detected while the pupils PL1/PL2 moving from one interested point IPa to another interested point IPb of the target object OBJ3. Operation S500 is performed to display the dimensional parameter DM3 of the target object OBJ3 on the displayer 320.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A head mounted device, comprising:
   a displayer;
   an eye-tracking module, configured for tracking positions and movements of two pupils;
   a control module, communicated with the displayer and the eye-tracking module, the control module is configured to:

determine a target object located in front of the head mounted device according to the positions of the pupils;

obtain a gap distance between the pupils and the target object;

calculate a dimensional parameter of the target object according the gap distance and the movements of the pupils; and display the dimensional parameter on the displayer.

2. The head mounted device of claim 1, wherein the control module is further configured to:

calculate a convergence angle between two visions of the pupils according to the positions of the pupils;

calculate an interpupillary distance between the pupils according to the positions of the pupils; and calculate the gap distance according to the interpupillary distance and the convergence angle.

3. The head mounted device of claim 2, wherein when the positions of the pupils are detected to move simultaneously, the convergence angle is calculated according to concurrent positions of the pupils.

4. The head mounted device of claim 2, wherein a first pupil of the pupils is detected to move further with a displacement when a second pupil of the pupils is detected to stop at an orbital border and, the control module is further configured to:

calculate a simulated position of the second pupil according to a current position of the second pupil and the displacement of the first pupil; and calculate the convergence angle between two visions of the pupils according to the simulated position of the second pupil and a current position of the first pupil.

5. The head mounted device of claim 1, further comprising:

a depth camera module comprising a plurality of image sensors for generating a depth map in front of the head mounted device.

6. The head mounted device of claim 5, wherein the control module is configured to locate a corresponding position of the target object in the depth map, and the gap distance is obtained according a depth value at the corresponding position in the depth map when the target object is located in an overlapping region between field of views of the image sensors.

7. The head mounted device of claim 6, wherein when the target object is not located in the overlapping region between the field of views of the image sensors, and a first pupil of the pupils is detected to move further with a displacement when a second pupil of the pupils is detected to stop at an orbital border, the control module is further configured to:

calculate an interpupillary distance between the pupils according to the positions of the pupils;

calculate a simulated position of the second pupil according to a current position of the second pupil and the displacement of the first pupil;

calculate a convergence angle between two visions of the pupils according to the simulated position of the second pupil and a current position of the first pupil; and calculate the gap distance according to the interpupillary distance and the convergence angle.

8. The head mounted device of claim 1, comprising:

a front camera module, configured to capture a front image covering the target object located in front of the head mounted device, wherein the dimensional parameter is displayed at a corresponding position of the target object on the displayer, and the corresponding position is determined by the front image captured by the front camera.

9. The head mounted device of claim 8, wherein the displayer is a non-see-through display, the front image captured by the front camera module is processed into stereoscopic visions and displayed on the displayer.

10. The head mounted device of claim 1, wherein the displayer is a see-through display, the target object is directly visible to a user of the head mounted device.

11. A control method, suitable for a head mounted device, the control method comprising:

tracking positions and movements of two pupils;

determining a target object located in front of the head mounted device according to the positions of the pupils;

obtaining a gap distance between the pupils and the target object;

calculating a dimensional parameter of the target object according the gap distance and the movements of the pupils; and displaying the dimensional parameter on a displayer of the head mounted device.

12. The control method of claim 11, wherein the step of obtaining the gap distance comprising:

calculating a convergence angle between two visions of the pupils according to the positions of the pupils;

calculating an interpupillary distance between the pupils according to the positions of the pupils; and calculating the gap distance according to the interpupillary distance and the convergence angle.

13. The control method of claim 12, wherein when the positions of the pupils are detected to move simultaneously, the convergence angle is calculated according to concurrent positions of the pupils.

14. The control method of claim 12, wherein a first pupil of the pupils is detected to move further with a displacement when a second pupil of the pupils is detected to stop at an orbital border, the step of calculating the convergence angle comprising:

calculate a simulated position of the second pupil according to a current position of the second pupil and the displacement of the first pupil; and calculate the convergence angle between two visions of the pupils according to the simulated position of the second pupil and a current position of the first pupil.

15. The control method of claim 11, further comprising:

generating a depth map in front of the head mounted device.

16. The control method of claim 15, further comprising:

locating a corresponding position of the target object in the depth map, wherein, when the target object is located in an overlapping region between field of views of the image sensors, the step of obtaining the gap distance comprises:

calculating the gap distance according a depth value at the corresponding position in the depth map.

17. The control method of claim 16, wherein when the target object is not located in the overlapping region between the field of views of the image sensors, and a first pupil of the pupils is detected to move further with a displacement when a second pupil of the pupils is detected to stop at an orbital border, the step of obtaining the gap distance comprises:

calculating an interpupillary distance between the pupils according to the positions of the pupils;

calculating a simulated position of the second pupil according to a current position of the second pupil and the displacement of the first pupil;

calculating a convergence angle between two visions of the pupils according to the simulated position of the second pupil and a current position of the first pupil; and calculating the gap distance according to the interpupillary distance and the convergence angle.

18. The control method of claim 11, comprising:

capturing a front image covering the target object located in front of the head mounted device;

determining a corresponding position of the target object on the displayer; and displaying the dimensional parameter at the corresponding position of the target object on the displayer.

19. The control method of claim 18, wherein the displayer is a non-see-through display, the control method further comprises:

processing the front image into stereoscopic visions; and displaying the stereoscopic visions on the displayer.

20. The control method of claim 11, wherein the displayer is a see-through display, the target object is directly visible to a user of the head mounted device.

* * * * *